US009897686B2

(12) United States Patent
Ghazinour et al.

(10) Patent No.: US 9,897,686 B2
(45) Date of Patent: Feb. 20, 2018

(54) ACTIVE IQ AND QUADRATURE GENERATOR FOR HIGH FREQUENCY APPLICATIONS

(71) Applicants: Akbar Ghazinour, Ottobrunn (DE); Bernhard Dehlink, Munich (DE)

(72) Inventors: Akbar Ghazinour, Ottobrunn (DE); Bernhard Dehlink, Munich (DE)

(73) Assignee: NXP USA, Inc., Austin, TX (US)

( * ) Notice: Subject to any disclaimer, the term of this patent is extended or adjusted under 35 U.S.C. 154(b) by 217 days.

(21) Appl. No.: 14/767,295

(22) PCT Filed: Feb. 12, 2013

(86) PCT No.: PCT/IB2013/051138
§ 371 (c)(1),
(2) Date: Aug. 12, 2015

(87) PCT Pub. No.: WO2014/125325
PCT Pub. Date: Aug. 21, 2014

(65) Prior Publication Data
US 2015/0369903 A1 Dec. 24, 2015

(51) Int. Cl.
*G01S 7/285* (2006.01)
*G01S 7/288* (2006.01)
(52) U.S. Cl.
CPC ....... *G01S 7/285* (2013.01); *G01S 2007/2886* (2013.01)
(58) Field of Classification Search
CPC .. G01S 7/285; G01S 7/288; G01S 2007/2886; G01S 2007/358
See application file for complete search history.

(56) References Cited

U.S. PATENT DOCUMENTS 5,357,221 A * 10/1994 Matero ................ H03H 11/22
327/254
7,773,965 B1 8/2010 Van Brunt et al.
(Continued)

OTHER PUBLICATIONS

V. Filimon, et. al., "A Pre-Crash Radar Sensor System Based on Pseudo-Noise Coding," IEEE MTTS Digest, 06, pp. 1415-1418, Jun. 2000.
(Continued)

*Primary Examiner* — Timothy A Brainard
*Assistant Examiner* — Daniel P Malley, Sr.
(74) *Attorney, Agent, or Firm* — Charlene R. Jacobsen

(57) ABSTRACT

An active I/Q generator circuit comprises an input node for receiving a reference oscillation signal. The circuit has an I-output and a Q-output for respectively outputting an I-signal and a Q-signal. A first active component is electrically coupled to the input node and arranged to amplify the reference oscillation signal and to output an amplified reference oscillation signal. A second active component is electrically coupled to the first active component to receive the amplified reference oscillation signal. The second active component is arranged to generate, based on the amplified reference oscillation signal, an in-phase signal and a, with respect to the in-phase signal, phase shifted signal, the second active component electrically coupled to the in-phase signal output for providing the in-phase signal and electrically coupled to the quadrature-phase output for providing the phase-shifted signal.

10 Claims, 8 Drawing Sheets

(56) References Cited

U.S. PATENT DOCUMENTS

| | | | |
|---|---|---|---|
| 2001/0033624 | A1 | 10/2001 | Knierim et al. |
| 2002/0049044 | A1* | 4/2002 | Indseth .................. H03D 3/007 455/118 |
| 2003/0133517 | A1 | 7/2003 | Takinami et al. |
| 2006/0033562 | A1* | 2/2006 | Yang ........................ H03F 1/223 390/98 |
| 2008/0231362 | A1* | 9/2008 | Muthali .................... H03F 1/32 330/253 |
| 2008/0247490 | A1 | 10/2008 | Fortuin et al. |
| 2009/0237161 | A1* | 9/2009 | Fagg ................... H03F 3/45242 330/253 |
| 2010/0013527 | A1 | 1/2010 | Warnick |
| 2011/0102088 | A1* | 5/2011 | Rajendran ............... H03F 1/223 330/277 |
| 2012/0139643 | A1* | 6/2012 | Scott ..................... H03F 1/0272 330/296 |
| 2013/0315348 | A1* | 11/2013 | Tasic ........................ H03G 3/20 375/340 |

OTHER PUBLICATIONS

J. Fenk, et. al., "An RF front-end for digital mobile radio," in ProcIEEE Bipolar Circuits and Technology Meeting, Sep. 1990, pp. 240-247. .

K.G. Park, et. al, "Current Reusing VCO and Divide-by-Two Frequency Divider for Quadrature LO Generation", IEEE Microwave and Wireless Components Letters, vol. 18, No. 6, Jun. 2008.

H. Veenstra, et. al. "60GHz Quadrature Doppler Radar Transceiver in a 0.25 μm SiGe BiCMOS Technology", 2008 IEEE.

E. Öjefors and U. Pfeiffer, "A 94-GHz Monolithic Front-End for Imaging Arrays in SiGe:C Technology", 2008 EuMA.

E. Ragonese, et. al. "A SiGe BiCMOS 24-GHz receiver front-end for automotive short-range radar", Analog Integr. Circ. Sig. Process 2011, pp. 121-130.

H. Erkens, et. al. "A Novel SiGe RFIC Approach Towards Low-Cost S-Band Transmit/Receive Modules", 2009 IEEE.

A. Müller, et. al.,"A 122 GHz SiGe Active Subharmonic Mixer", in 13th GAAS Symposium, Paris France, Oct. 2005 pp. 57-60.

S. Trotter, "SiGe Circuits for Spread Spectrum Automotive Radar", IEEE International Conference ICUWB, Nov. 2007, pp. 523-528.

C. Wagner et. al. "A Fully Differential 77-GHz Active IQ Modulator in a Silicon-Germanium Technology", IEEE microwave and wireless components letters, vol. 18, No. 5, May 2008.

B.A. Floyd, et. al., "SiGe bipolar transceiver circuits operating at 60 GHz", IEEE Solid-state Circuits, Jan. 2005, pp. 156-167.

International Search Report and Written Opinion correlating to PCT/IB2013/051138 issued on Nov. 26, 2013.

* cited by examiner

US 9,897,686 B2

ACTIVE IQ AND QUADRATURE GENERATOR FOR HIGH FREQUENCY APPLICATIONS

FIELD OF THE INVENTION

This invention relates to circuits and topologies for generating I/Q and/or quadrature output signals.

BACKGROUND OF THE INVENTION

An increased interest in high frequency imaging for sensing and security applications has recently created a demand for integrated receiver ends. Some radar systems may use in-phase) (I,0°) and quadrature-phase (Q,90°) signals for determining the distance of a target and its relative velocity. For example, in a pulsed Doppler-radar system, the received and reference signals may be out-of-phase such that the coherent detection results in zero output. Thus, no information may be extracted about the target's relative velocity. In such a case, a second branch may be shifted in-phase by 90° to obtain the desired data (e.g., relative velocity). That is, the combination of both I/Q-components results in no loss of information.

SUMMARY OF THE INVENTION

The present invention provides an active in-phase quadrature-phase, "I/Q", generator circuit, an active quadrature generator circuit, and a radio-frequency front-end as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

In the following, the term "reference oscillation signal" may refer to a reference signal of suitable frequency(ies) that may be a received from an external source or reference signals of suitable frequency(ies) generated by, for example, a part of the circuit, such as a local oscillator. The terms "relative phase mismatch" and "relative phase error" refer to the phase mismatch between two or more signals in comparison to an intended phase offset (e.g., a Q signal that is a 90 degree phase-shifted version of an I signal has no relative phase mismatch).

I/Q-signals may be generated digitally using discrete active devices (e.g., a divider-by-two flip flop).

The divider-by-two technI/Que may require a frequency doubler in order to transfer the I/Q-signals back to the desired/origin frequency range. Such approaches for mm-wave applications may result in high-power-consuming devices.

Analog-based solutions may include lumped passive elements by a multistage RC-polyphase filter "PPF" or distributed millimeter-wave components (e.g., a branch-line coupler "BLC"). The analog methods (PPF and BLC) may be used at the local oscillator (LO) port of the receivers frontend to generate the quadrature LO signals for mixers.

The polyphase filter (PPF) technI/Que may be implemented with a passive RC network, which introduces power loss and additional phase noise. In order to reduce the relative phase error and amplitude (gain) mismatch of the I/Q-signals over a desired frequency range, a high order PPF may be used. Thus, the power loss may often be greater than 10 dB, and phase noise may become large. Additional power might be dissipated in the LO buffer, which may be required for compensating for the power loss in the passive PPF. A degradation of phase and magnitude accuracy of the PPF occurs at high frequencies due to the parasitic of RC-network.

Figure 1:
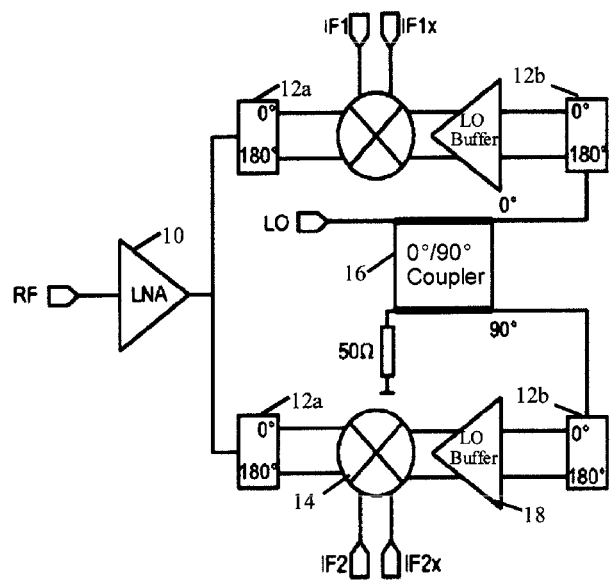
FIG. 1 shows a circuit diagram of an example of a mono-static radar system with a BLC topology.

FIG. 1 shows an example of mono-static radar system 100. System 100 includes low noise amplifier, LNA, 10, 0°/180° couplers 12a and 12b, mixers 14, a 50Ω resistor, 0°/90° coupler 16, and LO Buffers 18. A local oscillator LO may feed coupler 16 to produce an I/Q signal for determining the distance of a target and its relative velocity. The I/Q signal may be fed into couplers 12b. The outputs of couplers 12b may be fed into LO buffers 18. The output of LO buffers 18 may be fed into mixers 14, which may output intermediate frequencies IF1, IF1x, IF2, and IF2x.

On the other side of system 100, a radio frequency input RF may feed LNA 10 with a received radio frequency input signal. The output of LNA 10 feeds couplers 12a. The output of couplers 12a also feed mixers 14.

λ/4 transmission lines may be used for each of the four branches. For example, the length of each λ/4 transmission line for a 77 GHz implementation of system 100 may be approximately 0.5 mm.

Figure 2:
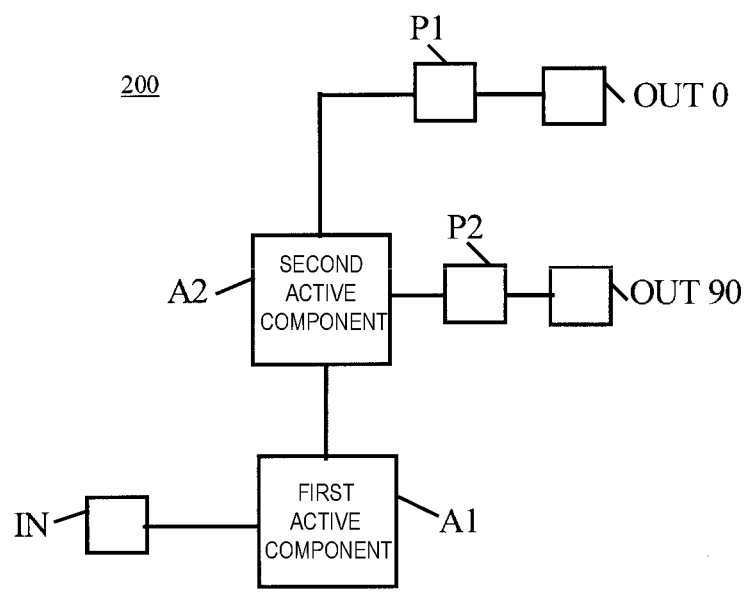
FIG. 2 schematically shows a block diagram of an example of an active I/Q generator circuit.

FIG. 2 schematically shows an example of active I/Q generator circuit 200. The circuit 200 may be used in a radio frequency front end, and for example be used to receive RF signals with a carrier frequency in the range of 10 to 100 GHz, or even higher, for example in the IEEE designated Q, V, W or D bands. Active I/Q generator circuit 200 includes a modified cascode amplifier comprising a stack of active components A1,A2 connected in series between the positive and negative voltage supply Vcc,Vss. In this example, as a first active component A1 an amplifier (in this example a transconductance amplifier) is shown, which may be electrically coupled to an input node IN for receiving a reference oscillation signal generated, for example, by a local oscillator. Active I/Q generator circuit further includes as a second active component A2 another amplifier, in this example a modified buffer amplifier, which may be electrically coupled to an in-phase signal output, I-output for short, OUT 0 and a quadrature-phase signal output, Q-output for short, OUT 90 of active I/Q generator circuit 200. The modified buffer amplifier is, like in the traditional cascode, arranged in a stack in series but modified in the sense that instead of having a common control terminal, such as a common gate or base, the control terminal is floating and connected to one of the I or Q outputs. At the I- and Q-output, the I and Q signals may be outputted, respectively. In operation, second active component A2 receives an input signal amplified by first active component A1 and outputs in-phase and quadrature-phase signals based on the amplified input signal.

Active I/Q generator circuit 200 may further include passive components P1 and P2. Passive components include capacitors and inductors and may be implemented as lumped elements or distributed elements (e.g., transmission lines). The parameters of passive components P1 and P2 may be optimized such that at least one of a relative phase mismatch and an amplitude mismatch between in-phase and quadrature-phase signals of the second active component A2 may be minimized, or at least reduced, so as to obtain the I- and Q-signals. For example, in a transmission line embodiment of the passive components P1 and P2 in a 77 GHz radar system, the lengths of transmission line embodiments for each of passive components P1 and P2 may be 250 um or less. That is, passive components P1 and P2 may merely need to correct for minor phase and/or amplitude anomalies between the in-phase and quadrature-phase signals at the outputs of second active component A2 rather than shift a signal the full 90 degrees in phase, because second active component may be arranged to output signals with a significant relative phase shift already, for example of 90 degrees with respect to each other. Thus, the second active component can provide signals that, except for a small phase or amplitude mismatch, are already suitable as I and Q signals.

Although not shown, active components A1 and A2 will typically be electrically coupled to a positive voltage supply, a ground, and/or a negative voltage supply.

Figure 3:
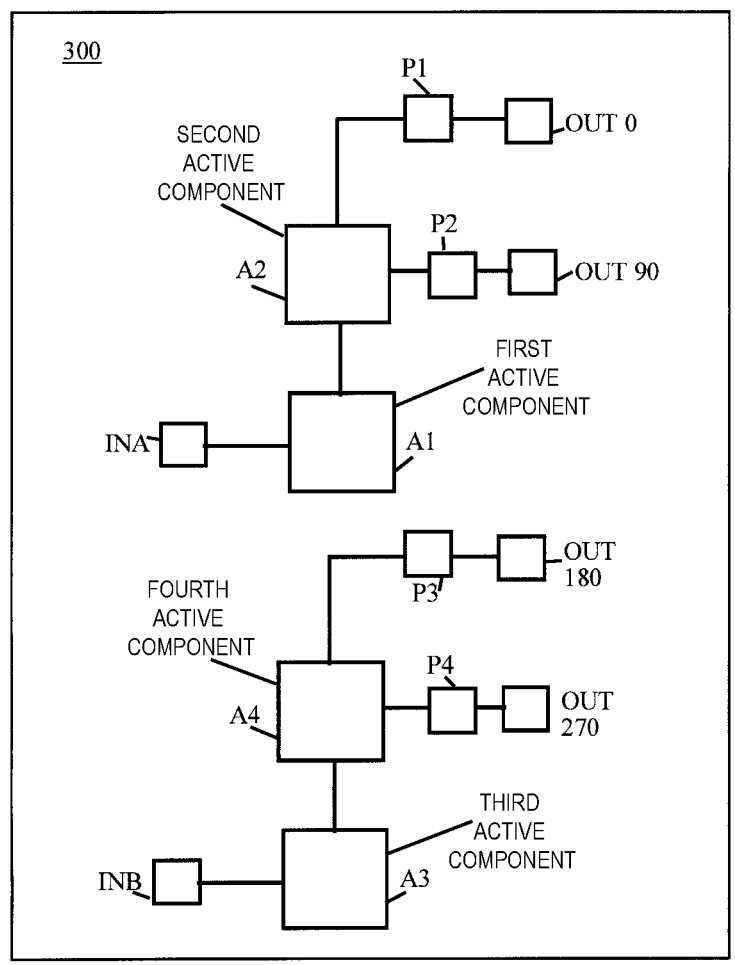
FIG. 3 schematically shows a block diagram of an example of an active quadrature generator circuit FIG. 4 schematically shows a circuit diagram of an example of an active I/Q generator circuit.

FIG. 3 schematically shows an example of active quadrature generator circuit 300. Features shared with FIG. 2 will not be described in further detail below. The circuit 300 has a differential topology with two inputs INA,INB to receive a differential signal. The topology comprises a cascode amplifier as in FIG. 2 connected to input node INA of which first active component A1 receives, for example, an in-phase or I signal from input node INA. In addition, the circuit 300 comprises a second cascade amplifier with as third and fourth active components A3,A4 respectively an amplifier, e.g. a transconductance amplifier, and another amplifier, e.g. a modified buffer amplifier. Third active component A3 receives, for example, an antiphase signal (i.e., a signal 180 degrees out of phase with an I signal) from input node INB. Fourth active component A4 may correspond to second active component A2 of FIG. 1, i.e., be similarly arranged to output signals phase-shifted by approximately 90 degrees relative to the anti-phase signal. Because third active component A3 may receive an antiphase signal, fourth active component A4 may output signals phase shifted 180 and 270 degrees with respect to an in-phase signal. Passive components P3 and P4 may be similarly arranged as passive components P1 and P2, i.e., passive components P3 and P4 may be optimized such that at least one of a relative phase mismatch and an amplitude mismatch between output signals of fourth active component A4 may be minimized.

Figure 4:
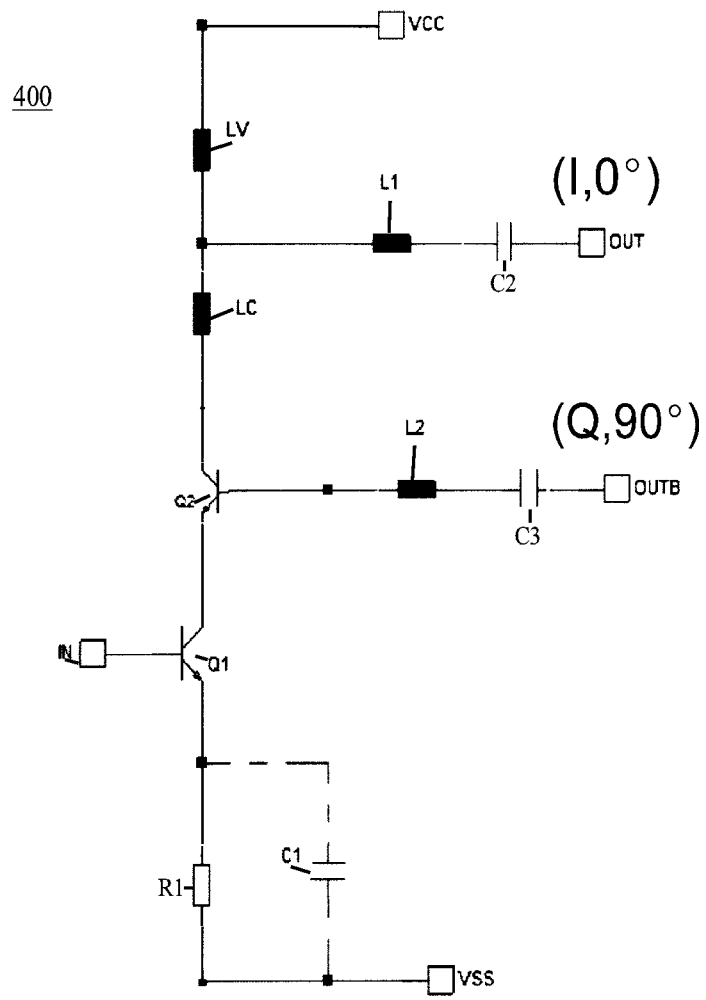

FIG. 4 schematically shows an example of active I/Q generator circuit 400. Active I/Q generator circuit 400 includes a cascade amplifier with first transistor Q1 as transconductance amplifier. The control terminal of the first transistor, i.e. the base in case of a bipolar transistor and the gate in case of a field effect transistor, may be electrically coupled to an input node IN for receiving a reference oscillation signal generated, for example, by a local oscillator. The active I/Q generator circuit further includes a modified buffer amplifier implemented in this example by second transistor Q2 as a first current terminal of the second transistor, e.g. emitter or source, may be electrically coupled to a second current terminal of the first transistor, e.g. collector or drain, and the second transistor may be electrically coupled with its second current terminal to a first voltage supply node VCC and an in-phase signal output OUT. The control terminal of the second transistor, e.g. base or gate, may be electrically coupled to a quadrature-phase signal output OUTB.

The modified buffer amplifier introduces a phase-shift between the control terminal and the second current terminal, as for example when the modified buffer amplifier exhibits an (intrinsic) reactance with a capacitive component between the control terminal and the second current terminal, e.g. due to parasitic capacitance(s) in the path between the control terminal and the second current terminal. For example for signals with a frequency in the range of 10 to 100 GHz, or even higher such as for example in the IEEE designated Q, V, W or D bands, the phase shift will be significant and be selected to be under normal operating, to be as closed to 90 degrees as possible. For example it has been found that a phase-shift of 45 degrees of more is obtainable.

The active I/Q generator circuit 400 may, as shown in FIG. 4, further include inductive or other passive elements L1, L2, and LC to compensate for relative phase and/or amplitude mismatches in the in-phase and quadrature signals (I,0°) and (Q,90°). Inductive elements L1, L2, and LC may be implemented as lumped elements or distributed elements (e.g. transmission lines). The parameters of transmission lines L1, L2, and LC may be optimized such that at least one of a relative phase mismatch and an amplitude mismatch between output signals of the second transistor may be minimized. For example, the lengths of transmission line embodiments of inductive elements L1, L2, and LC may be 250 um or less, which may be considerably shorter than the transmission line length of system 100 (e.g., 0.5 mm). That is, inductive elements L1, L2, and LC may merely need to correct for minor phase and/or amplitude anomalies between the base and collector outputs of second transistor Q2 rather than shift a signal a quarter-wave length. The passive components may be connected to the outputs OUT,OUTB via capacitors C2 and C3 which decouple a DC component of transistor Q2 output from circuits downstream (in a direction of current flow) of the outputs OUT,OUTB.

In the shown example, the second current terminal of the second transistor Q2 is connected to first voltage supply node VCC via an impedance LV. The impedance LV may provide a blocking impedance for output VCC. VCC may be providing a positive voltage supply.

In the shown example, the first current terminal of the first transistor Q1 is connected to second supply node VSS, which may be grounded or providing a negative supply voltage. As shown, between the first current terminal of the first transistor and the second supply node VSS, a resistance R is provided to ensure a suitable input impedance of active I/Q generator circuit 400. In parallel to the resistance R, a capacitor C1 may be provided for improving the noise figure (NF). Capacitor C1 may for example be a metal-insulator-metal (MIM) capacitor.

Figure 5:
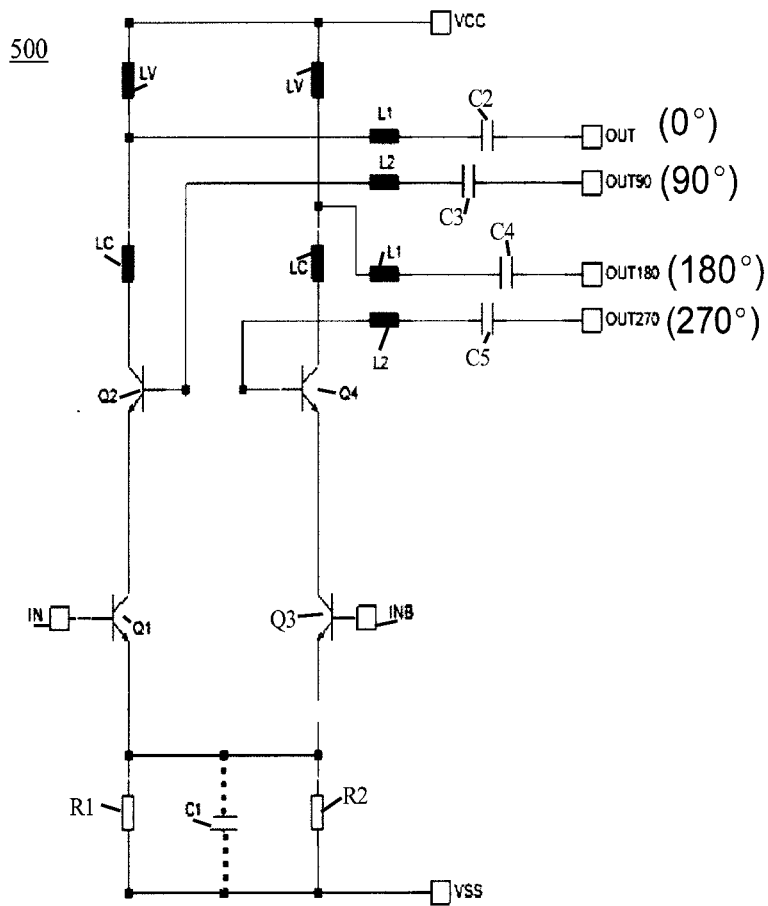
FIG. 5 schematically shows a circuit diagram of an example of an active quadrature generator circuit.

FIG. 5 schematically shows an example of active quadrature generator circuit 500. Features shared with FIG. 4 are not described in further detail. The shown example has a differential topology with two cascode amplifiers (comprising respectively transistors Q1 and Q2 and transistors Q3 and Q4) similar to the one of FIG. 4. The circuit 500 has a differential input IN, INB for receiving respectively an in-phase and an anti-phase signal. Each of the cascode amplifiers is connected to a respective one of the inputs IN,INB. In the first cascode amplifier, transistor Q1 receives, for example, an in-phase or I signal from input node IN while in the second cascode amplifier transistor Q3 receives, for example, an antiphase signal (i.e., a signal 180 degrees out of phase with an I signal) from input node INB. Because transistor Q4 may receive an amplified, but inverted signal from transistor Q3, transistor Q4 may output signals phase shifted 180 and 270 degrees with respect to an in-phase signal. Capacitors C2, C3, C4, and C5 may decouple the output of transistors Q2 and Q4 from downstream circuits.

Figure 6:
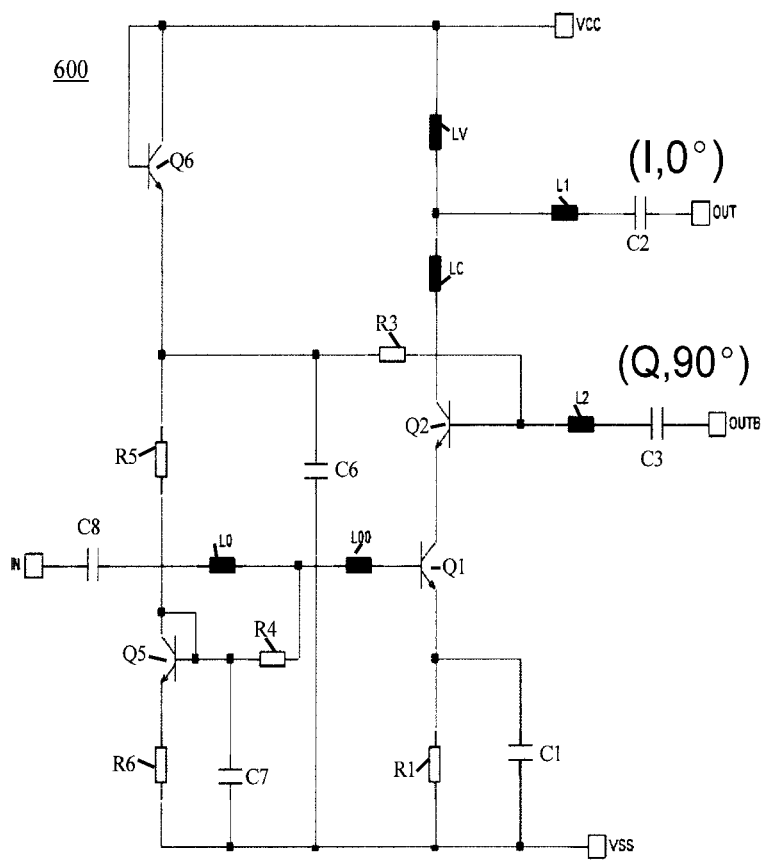
FIG. 6 schematically shows a circuit diagram of another example of an of an active I/Q generator circuit.

FIG. 6 schematically shows an example of active I/Q generator circuit 600. Features shared with FIG. 4 are not described in further detail. Relative to the example of FIG. 4, the active I/Q generator circuit 600 further includes filtering circuitry for conditioning an input signal and biasing circuitry. The filtering circuitry includes transistors Q5 and Q6, resistors R3, R4, R5, and R6, and capacitors C6 and C7. In this example, resistors R3 and R4 serve to decouple an RF-part of a signal (e.g., a high frequency part) from biasing circuits. Capacitors C6 and C7 serve to remove the rest of a high frequency signal by shorting the signal to ground. Capacitor C8 may be used for AC coupling an input signal in order to isolate the DC bias setting of the coupled circuits (e.g. at the input). Inductors L0 and L00 may be used for impedance matching at the input.

Figure 7:
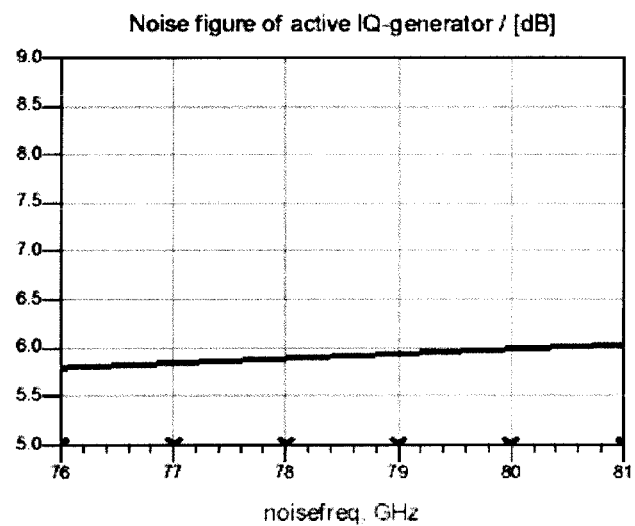
FIG. 7 is a chart showing noise figures obtained for the example of FIG. 6 with noise figure as a function of noise frequency.
Figure 8:
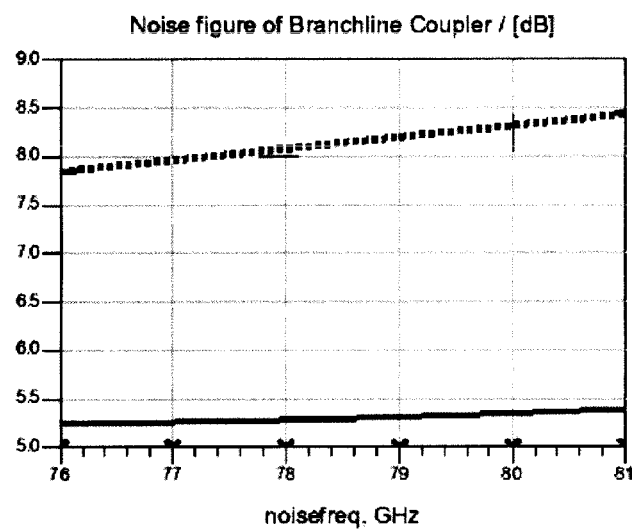
FIG. 8 is a chart showing noise figures obtained for the example of FIG. 1 with noise figure as a function of noise frequency.

FIGS. 7 and 8 are charts showing the respective noise figures for generator circuit 600 and system 100. Regarding FIG. 8, the solid line may be the NF for system 100 without an amplifier compensating for I/Q signal loses, and the dotted line may be the NF for system 100 with an amplifier. As can be clearly seen, generator circuit 600 has a lower NF than system 100 with an amplifier, which may be often required to compensate for coupler-based power losses.

Figure 9:
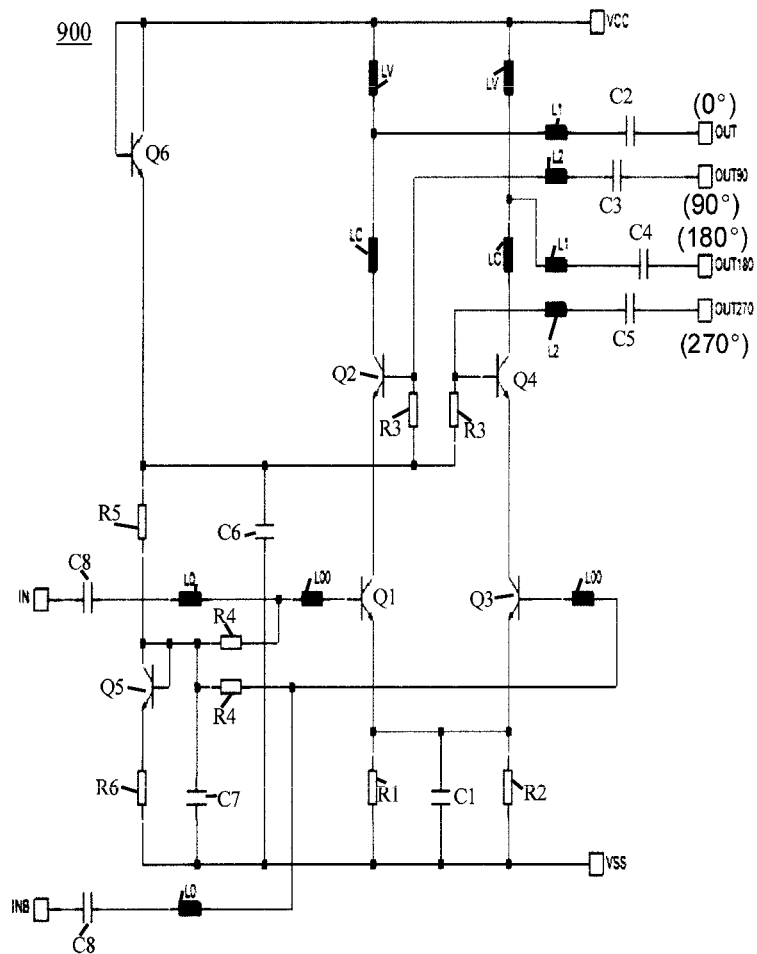
FIG. 9 schematically shows a circuit diagram of another example of an active quadrature generator circuit.

Referring to FIG. 9, features similar to those in the example of FIGS. 4, 5, and 6 are not described in further detail. FIG. 9 shows an example of active quadrature generator circuit 900 with similar topology as the example of FIG. 5. Compared to the example of FIG. 5, quadrature generator circuit 900 further includes filtering circuitry for conditioning input signals and biasing circuitry. The filtering circuitry includes example, resistors R3 and R4 may decouple an RF-part of a signal (e.g., a high frequency part) from biasing circuits. Capacitors C6 and C7 may remove the rest of a high frequency signal by shorting the signal to ground. Capacitors C8 may be used for AC coupling an input signal in order to isolate the DC bias setting of the coupled circuits (e.g., here at the input).

In the foregoing specification, the invention has been described with reference to specific examples of embodiments of the invention. It will, however, be evident that various modifications and changes may be made therein without departing from the broader scope of the invention as set forth in the appended claims and that the claims are not limited to the specific examples shown.

For examples, the circuits may be implemented on a SiGe substrate and the transistors may be implemented as HBTs on silicon-germanium. In such embodiments, high-performance parameters may be achieved over a wide frequency range (e.g. 76 to 81 GHz) in a small die size in comparison to system 100. However, the circuits may likewise be implemented on other types of substrates, such as GaAs, GaN, Si or other types of substrates. Furthermore, a generator circuits may be implemented on a single die or multiple dice, and the die or dice may be provided in a single integrated circuit package.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An active in-phase quadrature-phase generator circuit, comprising:
   an input node for receiving a reference oscillation signal;
   an in-phase signal output for outputting an in-phase signal;
   a quadrature-phase signal output for outputting a quadrature-phase signal;
   a first transistor including a first transistor control terminal electrically coupled to the input node, a first transistor first current terminal and a first transistor second current terminal, and arranged to amplify the reference oscillation signal and output an amplified reference oscillation signal; and
   a second transistor including a second transistor control terminal, a second transistor first current terminal electrically coupled to the first transistor second current terminal and a second transistor second current terminal, and arranged to generate, based on the amplified reference oscillation signal, the in-phase signal and a, with respect to the in-phase signal, phase shifted signal, the second transistor second current terminal electrically coupled to the in-phase signal output for providing said in-phase signal and the second transistor control terminal electrically coupled to the quadrature-phase signal output for providing said phase-shifted signal.

2. The active in-phase quadrature-phase generator circuit of claim 1, wherein the second transistor exhibits a reactance with a capacitive component between the second transistor control terminal and the second transistor second current terminal.

3. The active in-phase quadrature-phase generator circuit of claim 1, further comprising a first passive component and a second passive component, the first passive component arranged between the second transistor and the quadrature-phase signal output and the second passive component arranged between the second transistor and the in-phase signal output.

4. The active in-phase quadrature-phase generator circuit of claim 3, the first and second passive components arranged to obtain from the phase-shifted signal said quadrature-phase signal by at least changing the phase and/or amplitude of the phase-shifted signal relative to the in-phase signal.

5. The active in-phase quadrature-phase generator circuit of claim 4, wherein the phase-shifted signal exhibits a relative mismatch comprising one or more of a phase mismatch or an amplitude mismatch with the quadrature-phase signal, and the first and second passive components are configured to reduce said relative mismatch.

6. The active in-phase quadrature-phase generator circuit of claim 3, further comprising first and second inductive elements, the first inductive element arranged between the second transistor and the quadrature-phase signal output and the second inductive element arranged between the second transistor and the in-phase signal output.

7. The active in-phase quadrature-phase generator circuit of claim 6, further comprising a third inductive element arranged between a first voltage supply node and a collector of the second transistor.

8. The active in-phase quadrature-phase generator circuit of claim 7, wherein at least one of the first, second, and third inductive elements is a transmission line.

9. The active in-phase quadrature-phase generator circuit of claim 1, further comprising a capacitor arranged between the first transistor and a ground node or a second supply voltage node.

10. The active in-phase quadrature-phase generator circuit of claim 1, wherein the reference oscillation signal has a carrier frequency in the range of 10 to 100 GHz.

* * * * *